United States Patent [19]

Grüner

[11] Patent Number: 4,701,685
[45] Date of Patent: Oct. 20, 1987

[54] CONTROLLING A D.C. MOTOR

[75] Inventor: Manfred Grüner, Ulm, Fed. Rep. of Germany

[73] Assignee: Mannesmann Aktiengesellschaft, Duesseldorf, Fed. Rep. of Germany

[21] Appl. No.: 387,254

[22] Filed: Jun. 10, 1982

[51] Int. Cl.⁴ .............................................. G05B 5/00
[52] U.S. Cl. .................................... 318/309; 318/329
[58] Field of Search ................................ 318/309–314, 318/329, 345 B, 345 C, 345 E, 345 F, 345 G, 601, 603

[56] References Cited

U.S. PATENT DOCUMENTS

| 3,176,208 | 3/1965 | Gifft | 318/314 |
| 3,386,021 | 5/1968 | Fischer | 318/309 X |
| 3,784,890 | 1/1974 | Geiersbach et al. | |
| 3,953,776 | 4/1976 | Wolf | 318/312 |
| 4,375,609 | 3/1983 | Wolf | 318/312 |
| 4,376,914 | 3/1983 | Kimura | 318/603 |

Primary Examiner—Ulysses Weldon
Attorney, Agent, or Firm—Ralf H. Siegemund

[57] ABSTRACT

A d.c. motor is controlled by means of current pulses; each pulse ends by and in synchronism with an optical disk pulse. The period between respective two pulses is referenced to a particular period for determining the sign of a speed derivation, and the result is used to change the length of the pause between two current pulses for the motor. Digital counters are used for time-metering purposes and selection of the pause length between current pulses.

7 Claims, 3 Drawing Figures

CONTROLLING A D.C. MOTOR

BACKGROUND OF THE INVENTION

The present invention relates to the accurate control of a d.c.-motor, particularly of the type used in matrix printers.

In many special areas, a.c.-motors with a reducing transmission are used for driving particular components such as carriages. Such a.c.-motors with reducing gear are used, for example, in matrix printers. Of course, an a.c.-motor, such as a single-phase motor, cannot be adequately controlled in regard to speed by means of controlling the magnetic field as it is used, for example, in d.c.-shunt motors. Generally speaking, it must be said that devices and machines having reciprocating components which, in turn, control other elements, are not adequately driven by means of a.c.-motors without mechanical reduction for reasons of adequate lack of speed control. In the case of a matrix printer, a rather high accuracy of the speed is required. A matrix printer usually includes a print head mounted on a carriage and being driven across the platen. The speed of this carriage must be very accurate because it affects the overall appearance of the print. For this reason, a highly accurate speed control is necessary; but an a.c.-motor without mechanical reduction does not provide sufficiently constant speed. In the case of a d.c.-motor, particularly of a d.c.-shunt motor, one provides usually a stator field with a constant voltage so that the magnetic flux is also constant, except for the weakening by armature feedback. Even under load conditions, the d.c.-shunt motor exhibits a rather constant speed. However, in the case of a matrix printer, that constancy, or better that degree of constancy, is insufficient. Even if the motor current is subject to control, the obtained speed constancy is still not adequate.

DESCRIPTION OF THE INVENTION

It is an object of the present invention to provide a new and improved method and equipment for speed-controlling a d.c.-motor in order to obtain a high degree of accuracy in regard to speed constancy.

In accordance with the preferred embodiment of the present invention, it is suggested to drive the motor by means of pulses; at the end of a current pulse it is ascertained whether or not the motor runs too slowly or too fast, and the now ensuring current pause is metered toward correcting any speed inaccuracies. In the essence, the rotation of the motor is segmentized, for example, by means of a slotted optical disk, generating a sequence of pulses the primary function of which is to meter a sequence of time periods. These time periods, also called control cycle periods, will vary in length in accordance with the speed variations of the motor. At the beginning of each such period, it is ascertained, for example by means of counting, whether or not the particular pulse occurred too early or too late. Also, the motor current is turned off at that point; and in dependence upon the time and occurrence of the detection just made the now following current pause is metered in order to obtain either a longer or a shorter pause than was previously used before the motor current is turned on again.

This particular mode of operation is quite advantageous for reasons of accuracy. It is not the current pulse width which is directly subject to control because the end of the current pulse is, for example, delayed in case the motor runs too slow, or too early in case the motor runs too fast. Rather, the duration of the pause is varied in relation to the end of the preceding motor current pulse; the onset of the next current pulse is delayed or advanced in order to, thereby, shift the phase of such a current pulse with respect to the preceding current pulse, with the overall effect of establishing—and indirectly maintaining—a constant current pulse length. This then results, in effect, in an inherent, automated control characteristic.

The method as such could be practiced by means of analog circuitry; but it is of advantage to meter the respective periods by means of digital counting. This includes particularly, on one hand, counting the length of each such period defined and to ascertain, on the other hand, digitally whether or not such a period is terminated too early or too late. Also, the pause duration should be given by the state of another counter whose content is either decremented or incremented, depending upon the requirement for lengthening or shortening the period between current pulses.

The counter which is used for counting the period in between two sequential motor current pulses will count at an accuracy which is determined by a clock pulse rate. The rate determines the resolution of accuracy in the detection of any speed variation. Basically, it is suggested that clock pulses are provided to that counter and are to hold the counter when the critical or desired period has been reached. If the next motor device pulse occurs later, then the pause could be shortened; but if the motor-speed-representing pulse arrive before the fixed count state of that particular counter has been reached, the pause should be lengthened because the motor runs a little too fast. Thus, the comparison between reference and desired speed value, on one hand, and the actual speed, on the other hand, is made by detecting the occurrence of the beginning of a cycle period (as derived at, e.g., from an optical disk) relative to counting a fixed number of clock pulses.

The pauses between sequential motor current pulses are determined by another counter which is incremented or decremented depending upon the comparison at the first-mentioned counter. This first-mentioned counter can be used in addition to meter the requisite current pause length by counting clock pulses and by referencing the count state against the count state of the other counter whose content determines numerically the pause length. The maximum length of the current pause should be limited.

DESCRIPTION OF THE DRAWINGS

While the specification concludes with claims, particularly pointing out and distincly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawings, FIG. 1 illustrates a d.c.-motor 1, having a rated voltage of 52 volts and a current consumption of 2.2 amperes, amounting to approximately 92 watts at a rotational speed of 3000 revolutions per minute and a 100-percent duty cycle. Motor 1 drives a shaft 2 which, in turn, drives a belt 3 leading to a device to be moved linearly, for example, in each of two opposite directions. By way of example, this device may be comprised of the printhead of a matrix printer as it is being moved across a platen.

A slotted disk 4 is also mounted on shaft 2 and being provided with two annular tracks of slots 5a and 5b, whereby each slot of one track is slightly offset to a slot of the other track. The term "slot" is not necessarily to be understood literally; rather, what is involved is tracks of alternating, opaque and transparent segments. The disk 4 may, for example, be provided with 200 or 400 of such slots per track, the slots being precisely equdistantly spaced. An optical electronic scanning unit 6 has a light-emitting component and two radially aligned detectors or photo cells which respectively scan the two tracks of slots, 5a and 5b. It should be noted that in lieu of this arrangement one could use a single slot track and two slightly offset detectors.

Figure 1:
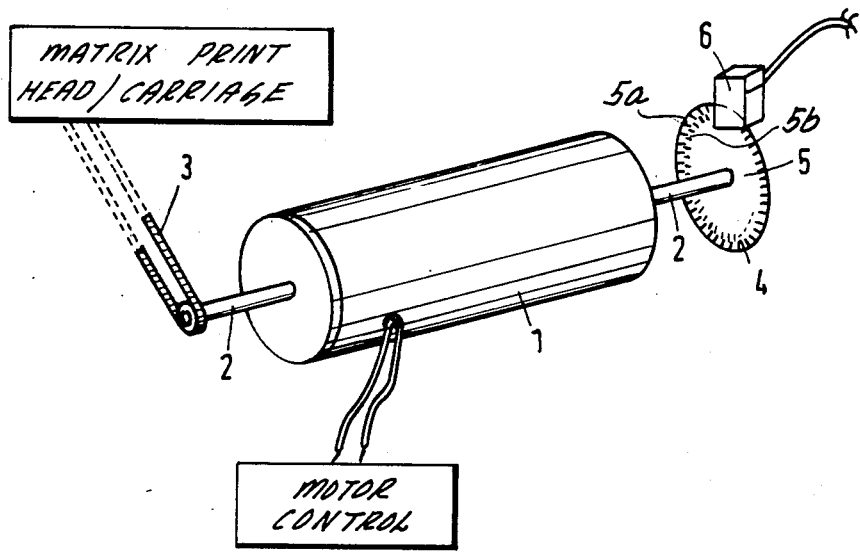
FIG. 1 is a somewhat schematic perspective view of a motor to be used in a matrix printer and being controlled in accordance with the preferred embodiment of the present invention.
Figure 2:
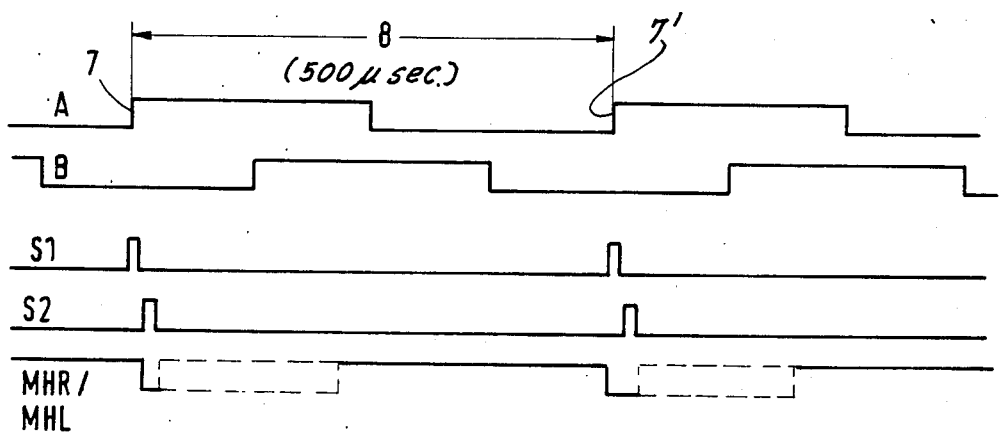
FIG. 2 is a graph illustrating pulses, some of which are developed in the device shown in FIG. 1.

The two detectors produce two output trains depicted in the upper two lines of FIG. 2, one train being indicated by A, and the other one, B, showing a slightly lagging phase in regard to signal track A. It should be noted that, basically, one uses only the signal A from one particular track, and signal B is used only for purposes of recognizing the direction of rotation of the motor. As far as the upper two lines of FIG. 2 are concerned, one may simply state that the time axis can be interpreted to run from left to right for one direction of rotation, but from right to left when the motor rotates in the opposite direction.

Of critical importance for the particular example illustrated here is the leading edge 7 of a pulse of train A, being the leading edge for rotation in one direction. That particular leading edge occurs when the concurrent signal level B is low. For rotation in the opposite direction, the leading edge of the pulses A is 7', which occurs at that instance when the signal train B is high. Other signals depicted in FIG. 2 will be explained more fully below.

In accordance with the principles of the invention, the control operation for the motor is carried out within each and any cycle period 8 as derived from the slotted disk 4. The requisite control conditions are ascertained in the respective preceding period 8 whereby the occurrence of the leading edge 7 is the controlling factor.

Figure 3:
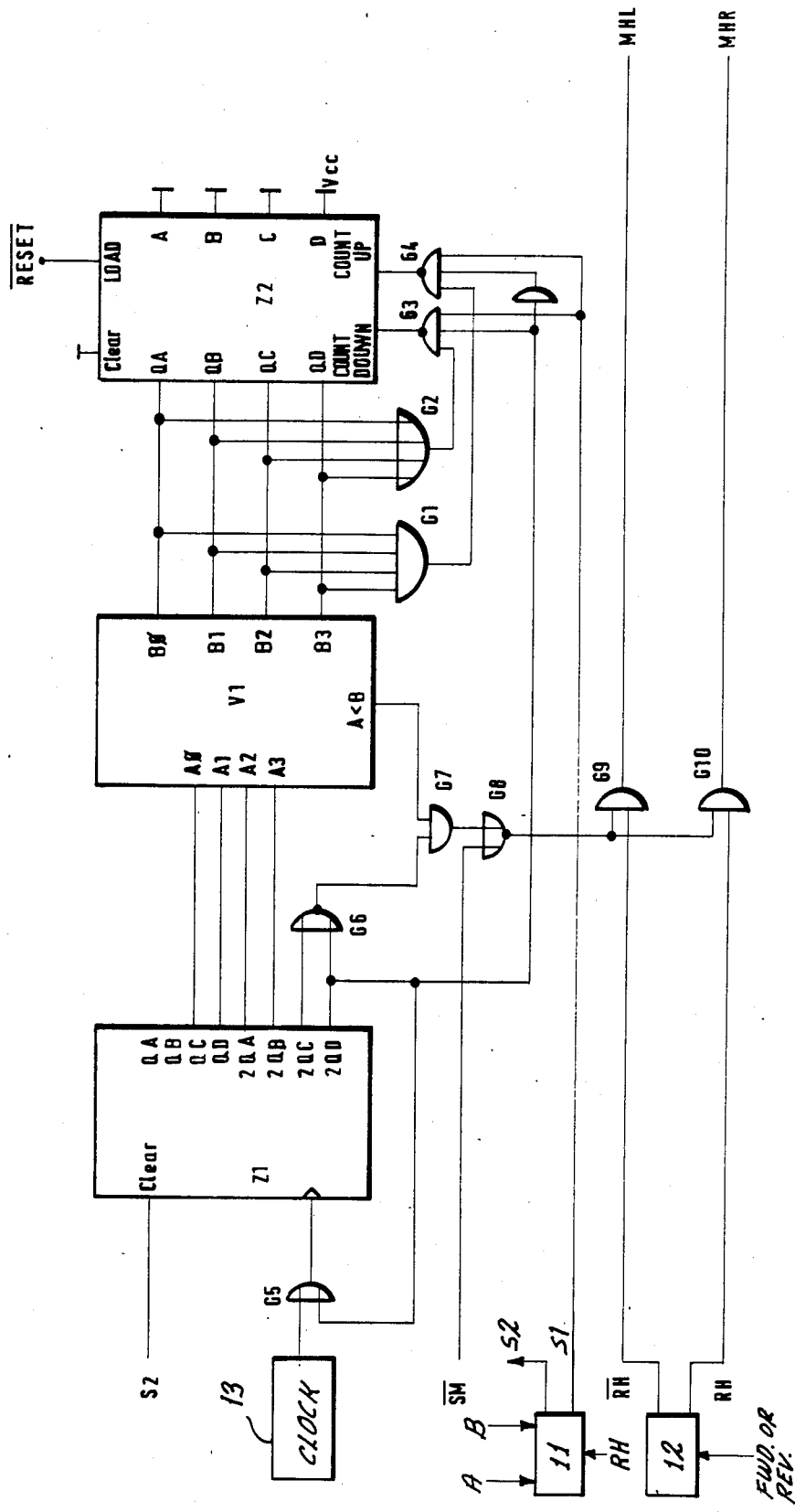
FIG. 3 is a block and circuit diagram for practicing the best mode of the present invention, particularly as controlling the motor as shown in FIG. 1.

Proceeding now to the description of FIG. 3, the circuit 11 therein responds to the two trains A and B and produces the leading edge signal S1. This particular signal may, for example, be produced by differentiating the leading edge of signal A as derived from the photo detector in unit 6, by squaring the signal as differentiated and gating it through a signal that can be logically expressed by B=0. In the case of reverse rotation, gating requires the condition B=1.

Another important signal for the circuit to be described is signal S2 which can be derived, for example, from signal S1 in that the trailing edge of signal S1 is used for the formation of signal S2. One may also say that signal train A is a train of pulsating signals, and pulses are derived therefrom in pairs (S1, S2), constituting a pulse train of which different portions perform different functions. A circuit 12 responds, for example, to an external command concerning the direction of a desired movement. The circuit 12 produces two signals, RH and $\overline{RH}$, being indicative, for example, of the movement of object 9 to the left or to the right, which is respectively expressed as $\overline{RH}$ and RH. The signals are used in circuit 11 for determining which one of the flanks (7 or 7') of signal train A is to be used for generating S1, S2.

The basic components of the control circuit illustrated in FIG. 3 include a counter Z1 by means of which the deviation of the actual speed of the motors from the desired speed is ascertained. In addition, there is provided a second counter Z2 which determines the length of the period of interruption of the current to motor 1. The motor 1 receives current pulses of constant amplitudes and at a rate determined by the cycles metered by the slotted disk 4; there is one motor current pulse per cycle period 8 accordingly. That current pulse ends right after a leading edge (7) of a signal A has passed, and the circuit as illustrated meters the length of the now ensuing pause and times the instance of motor current turn-on. It is convenient to designate the counter Z2 as a "pause counter."

The count states of the counters Z1 and Z2 are compared in a digital comparing circuit V1, having three outputs, but only one is being used, namely the one which turns "true" during any period of time in which the counter number in counter Z1 is smaller than the count number as provided by the counter Z2. A logic circuit, provided and established by a plurality of gates, processes the outputs of the counters and of the comparing circuit in a manner to be described.

The counter Z1 received a clear signal which the signal S2, occurring shortly after a leading edge 7 of signal train A. In other words, the counter Z1 is cleared shortly after the beginning of a period 8. The counter Z1 counts clock pulses from a clock 13 which is or includes, e.g., a quartz oscillator, and provides pulses at a particular rate. The clock pulse rate is basically arbitrary, but it is convenient to describe the invention with reference to a particular example; it is, therefore, presently assumed that the clock rate frequency provides 128 clock pulses during a period 8, provided the motor runs at the desired speed. The counter Z1 is constructed in the usual fashion, in which a count is triggered on a negative going clock input so that, therefore, an OR-gate G5 can be used for the purpose of gating the clock. The gate G5 has as a second input the highest digital output, designated 2 QD in counter Z1. Signal 2 QD turns "true" when the counter reaches a count state of 128. Thus, gate G5 blocks further clock pulses from reaching counter Z1, when the counter has reached that number. Therefore, by means of this particular circuit, the counter will stop counting and suppress further clock pulses once the counter has in fact reached "128". The counter Z1 is cleared on the next pulse S2, whenever it occurs. It may happen, however, that counter Z1 does not even reach count state 128 but is cleared before that instant in which case a cycle period 8 has just elapsed that was shorter than 128 clock pulses.

A NOR-gate G6 combines the two highest digital outputs of counter Z1 and provides an output to an AND-gate G7 whose second input is derived from the comparator V1. The output of gate G7 is, therefore, a logical "one" or "true" as long as the counter has not reached count number 64 and as long as, in fact, the count state of counter Z1 is below the count state of counter Z2. The output of AND-gate G7 is combined in a NOR-gate G8 and operates, in effect, as a gating or blocking signal for a motor control signal SM. NOR-gate G8 provides an output (=1) as long as the second input, $\overline{SM}$, is false, and only when the counter Z1 has exceeded count state 64 or when the count number of counter Z1 equals or exceeds the count state of counter Z2.

This gating signal from NOR-gate G8 is applied to the two gates G9 and G10, respectively receiving the left-forward signal $\overline{RH}$ or the right-forward signal RH. Therefore, depending upon the desired direction, either gate G9 produces a motor control signal MHL or a motor control signal MHR. In essence then, the circuit is designed to block and inhibit the motor control signals MHL or MHR, depending upon the direction and for a period of time within each cycle 8 beginning after a leading edge 7 and particularly the leading edge of pulse S2 and for a period during which the count state of the counter Z1 is still below the adjusted state of counter 22. This, then, is the current pause-metering process; and as soon as gate G7 turns "false," the motor current—either MHL or MHR—is turned on again.

Turning now to further particulars of counter Z1, it counts up to 128 clock pulses; but the comparator V1 receives only four inputs, derived from count stages having respectively binary values 4, 8, 16, and 32 (QC, QD, 2 QA and 2 QB). Therefore, the two low-order count bits are suppressed, and the two highest-order bits are not needed for the comparing process.

As far as the counter Z2 is concerned, this particular counter is a binary forward-and-reverse counter with a count-up input and countdown input. The pulses being counted are the pulses S1 which, however, are selectively fed to one or the other, or none, of the two count inputs of counter Z2. The criterion is the occurrence of the pulse S1, being the leading edge signal derived from the optical pulse train A, with reference to the count state of counter Z1 at the time of the arrival of pulse S1. This is, in effect, the comparison to be made with regard to the desired and the actual speed of the motor. If the pulse S1 occurs when the counter Z1 has not yet reached count number 128, then the motor is actually little fast so that the pause in between two motor current pulses has to be increased. This means that counter Z2 has to be incremented in order to lengthen the pause. Therefore, the pulse S1 is permitted to pass through the NAND-gate G4, being open as long as the counter Z1 has not reached 128, to now increase the count state of counter Z2 by one counting unit of counter Z2, which is equal to four clock pulses. Conversely, if the leading edge pulse S1 occurs after counter Z1 has reached count state 128, the motor is a little too slow so that the motor current pause should be shortened. Accordingly, the counter Z2 should be decremented and the pulse S1 is passed to the NAND-gate G3, and to the countdown input of counter Z2, for reducing the count state and number by one unit. In either case, the length of the current pause for motor 1 is immediately lengthened or shortened, depending upon which one occurs first, count state 128 in counter Z1 or pulse S2 which followed the termination of the preceding motor current drive pulse.

The two gates G1 and G2 are provided as a precaution; they block respectively the gates G4 and G3 in the case the counter Z2 tends to leave its range; in other words, the pause counter is to be limited, on one hand, to Zero, that means, no current pause, and, on the other hand, to a count state of 15, being, in fact, equivalent to a count state of 64 in counter Z1 which, in turn, is equal to half a regular period 8 (when equalling 128 clock pulses). The gate G1 provides a "true" output when the counter Z2 has reached 15, thereby stopping further incrementing of pause counter Z2 while gate G2, being an OR-gate, provides a "true" output as long as the state of counter Z2 is not Zero, but upon reaching Zero, inhibits further downcounting.

It should be realized that the counter Z1 is, in effect, a function-sharing device. On one hand, it determines whether or not the motor speed, represented by pulses S1, appears at intervals larger or smaller than a fixed interval as counted out by counter Z1 which, in the present example, has been assumed to be 128 clock pulses. On the basis of that comparison, further control operations such as incrementing and decrementing the motor current pause counter Z2 is carried out. In addition, however, the counter Z1 fulfills the function of metering the length of the current pause itself by counting clock pulses; and, as described, the motor current pause is terminated by turning the motor current on again when that particular counter state in counter Z1 equals the state of counter Z2.

A current control signal as shown in the lowest line of FIG. 2 always ends shortly after the leading edge of a pulse of train A. A variation is introduced by the control as described as far as the leading edge of the motor control current is concerned in that the ensuing pause is lengthened or shortened, depending upon the relative occurrence of that leading edge pulse S1 vis-a-vis the state of counter Z1. The particular pulse S1 decrements or increments the pause counter Z2, while immediately thereafter a pulse S2 clears the counter Z1 which begins to count out the next control and cycle period 8. The pulse S1, as stated, has incremented or decremented the pulse counter Z2, and only after the counter Z1 has reached the newly adjusted number as determined by the counter Z2 will the motor current be turned on again. This occurs still within the same cycle period 8 whose beginning marked the end of a preceding cycle period and the relative duration of the latter determined the new count state for counter Z2. It should be mentioned further that this particular control method does not directly determine the length of the current pulse as such. From the foregoing, it will be noted that, if for some reason the motor slows down a little, the leading edge of the next slot-marking pulse will occur a little latter. A leading edge of A, however, will always terminate a motor current pulse which, thereby, becomes, in fact, slightly extended. However, the control circuit as such and as described lengthens now the next current pause so that one may say that the duration of the motor pulses remains approximately constant, but their spacing is shifted commensurate with a readjustment of the optical pulse frequency.

The choice of 128 pulses as the desired value for the length of cycle period 8 is arbitrary but convenient, particularly because ascertaining a count state which is a power of "Z" can be implemented quite simply. The oscillator 13 may include reducing stages if the natural oscillating frequency of the quartz element is too high.

The invention is not limited to the embodiments described above; but all changes and modifications thereof, not constituting departures from the spirit and scope of the invention, are intended to be included.

I claim:

1. An apparatus for controlling the speed of a D.C. motor, comprising:
    metering means for providing a pulse train representative of the actual speed of the motor;
    first means, including a first, fixed-rate clock pulse counter for ascertaining whether or not the respective pulses of the train occur before or after a particular count number as counted by the first pulse counter has been reached;
    second means connected to the metering means for turning the motor current off in response to each of the pulses of the train;
    a second counter connected to be responsive to the ascertaining by the first means and further responsive to the pulses of the train for being decremented or incremented accordingly; and
    third means connected to the second counter for metering a current pause length being an interwall between the turning off of the motor current by operation of the second means and a subsequent turning on of the motor current, the third means providing for turning the motor current on again accordingly in termination of the pause and in dependence upon the state of the second counter.

2. The apparatus as in claim 1, the third means including the first counter being reset in response to pulses of the train by operation of the second means, further including a digital comparator connected to the first and second counters and providing for said turning on of the motor.

3. The apparatus as in claim 1, the metering means including an optical disk and means for scanning the disk for deriving therefrom the pulse train.

4. The apparatus as in claim 1, wherein the first counter stops and holds upon reaching the particular count number.

5. The apparatus as in claim 1 or 4, wherein the first counter is reset by pulses as derived from the train upon occurrence thereof, irrespective of whether or not the first counter has reached the particular count number.

6. The apparatus as in claim 1, the metering means including means for directly deriving a train of pulsating signals from the motor, and means for deriving said pulses from the pulsating signals, the train including pairs of such pulses of which the respective second one is derived from the respective preceding one.

7. The apparatus as in claim 6, wherein the second one of each pair of pulses resets the first counter and the first one decrements or increments of the second counter in dependence upon the ascertaining of the first means.

* * * * *